US009651261B2

(12) United States Patent
Sullivan et al.

(10) Patent No.: US 9,651,261 B2
(45) Date of Patent: May 16, 2017

(54) COMBUSTION TURBINE ENGINE COMBUSTOR BASKET IGNITER PORT ALIGNMENT VERIFICATION TOOL AND METHOD FOR VALIDATING IGNITER ALIGNMENT

(71) Applicant: Siemens Energy, Inc., Orlando, FL (US)

(72) Inventors: Peter C. Sullivan, Concord, NC (US); Michael J. Olejarski, Merrit Island, FL (US)

(73) Assignee: Siemens Energy, Inc., Orlando, FL (US)

( * ) Notice: Subject to any disclaimer, the term of this patent is extended or adjusted under 35 U.S.C. 154(b) by 405 days.

(21) Appl. No.: 14/314,109

(22) Filed: Jun. 25, 2014

(65) Prior Publication Data

US 2015/0377491 A1    Dec. 31, 2015

(51) Int. Cl.
| | | |
|---|---|---|
| *G01B 5/25* | (2006.01) | |
| *F23R 3/60* | (2006.01) | |
| *B33Y 50/02* | (2015.01) | |
| *B29C 67/00* | (2017.01) | |
| *B33Y 80/00* | (2015.01) | |

(52) U.S. Cl.
CPC .................. *F23R 3/60* (2013.01); *G01B 5/25* (2013.01); *B29C 67/0088* (2013.01); *B33Y 50/02* (2014.12); *B33Y 80/00* (2014.12); *F23R 2900/00017* (2013.01)

(58) Field of Classification Search
CPC ....... B23P 15/008; B23P 19/10; B23P 19/102; B23P 19/105; B23P 19/12; F05B 2230/60; F05B 2230/604; F05B 2230/608; Y10T 29/4932; Y10T 29/49895; Y10T 29/49902; Y10T 29/49764; Y10T 29/49778; Y10T 29/4978; Y10T 29/53913; Y10T 29/53917; Y10T 29/53983; Y10T 29/53987
USPC ............ 33/645, 613, 600, 607, 365, 366.11; 29/464, 466
See application file for complete search history.

(56) References Cited

U.S. PATENT DOCUMENTS

| | | | | |
|---|---|---|---|---|
| 3,590,461 | A * | 7/1971 | Siler | B25B 27/00 29/240 |
| 5,295,291 | A * | 3/1994 | Harris | B25B 27/0064 29/274 |
| 6,715,279 | B2 * | 4/2004 | White | F23R 3/002 60/39.821 |
| 8,099,963 | B2 * | 1/2012 | Pieussergues | F02C 7/266 60/39.821 |
| 8,171,719 | B2 | 5/2012 | Ryan | |

(Continued)

*Primary Examiner* — Jason L Vaughan
*Assistant Examiner* — Amanda Meneghini

(57) ABSTRACT

A combustion turbine engine combustor igniter port alignment and dimensional verification tool is insertable in guide tube and igniter boss portions of the igniter port. The tool has concentrically nested outer and inner sleeves, having respective circumferential profiles that are separately slidably insertable within corresponding igniter port guide tube and igniter boss portions that have inner circumferential profiles in conformance with minimal dimension specifications. Concentric alignment of the guide tube and igniter boss is validated by inserting the nested outer and inner sleeves into the igniter port. The verification tool is capable of validating igniter port alignment and dimensions before the combustor is installed in a combustion turbine engine.

17 Claims, 3 Drawing Sheets

(56) References Cited

U.S. PATENT DOCUMENTS 8,261,556 B2* 9/2012 Audin .................... F23R 3/002
  29/890.02
9,091,445 B2* 7/2015 Bunel .................... F02C 7/266

* cited by examiner

COMBUSTION TURBINE ENGINE COMBUSTOR BASKET IGNITER PORT ALIGNMENT VERIFICATION TOOL AND METHOD FOR VALIDATING IGNITER ALIGNMENT

BACKGROUND OF THE INVENTION

1. Field of the Invention

The invention relates to tools and methods for inspecting and validating internal circumferential minimal dimensions and coaxial alignment of combustion turbine combustor igniter ports, including prior to installation of a combustor into an engine, so that an igniter is insertable into the igniter port during subsequent engine assembly.

2. Description of the Prior Art

Known combustion turbine engines entrain and ignite atomized fuel within a flow of compressor supplied air passing through the combustor section. Hot combustion gasses thereafter are directed into a turbine section, where they convert heat energy into mechanical work by spinning shaft mounted turbine blades. Some known combustion turbine engines utilize combustor baskets having outer and inner combustor shrouds nested along a combustor centerline axis that envelop one or more air swirlers, a fuel injector for introducing atomized fuel into the combustor and an igniter that ignites the atomized fuel. The igniter is retained within an igniter port coupled to the inner and outer combustor shrouds at a port angle defined by an igniter port centerline axis and the combustor centerline axis. The igniter port includes a tubular guide tube and a tubular igniter boss that are concentrically aligned along the igniter port centerline axis. The guide tube has a proximal guide tube axial end that is coupled to and outwardly projects from the outer shroud and a guide tube inner circumferential profile having a first minimum dimension specification. The igniter boss has a proximal boss axial end that is coupled to and projects outwardly from the inner shroud, a distal boss axial end proximal the guide tube proximal end and an igniter boss inner circumferential profile having a second minimum dimension specification.

An igniter port constructed within nominal inner circumferential dimensions and axial alignment specifications allows insertion of an igniter therein without mechanical binding or interference fit. Additionally, an igniter port is oriented at a specified port angle for alignment of the igniter within the combustor. In the past, combustors, including igniter ports have been assembled outside of and subsequently installed in the turbine engine combustion section. The igniter was inserted and installed into the igniter port after the combustor installation within the engine. If, after installation of the combustor into the turbine engine, it was discovered that the igniter could not be inserted into the igniter port and/or that clearance between the two components was not sufficient and/or that the port angle was not within design specifications, the combustor had to be removed from the engine. Then the igniter port physical dimensions and/or alignment concentricity/angle had to be remediated before the combustor could be placed in service in an engine, ready to receive an igniter. Removal, remediation of igniter ports and reinstallation of remediated combustors in turbine engines wastes service time and effort as well as causes service delays. Often the combustors are replaced rather than remediated, which adds shipping delays until the replacement combustors arrive at the field site.

SUMMARY OF THE INVENTION

Accordingly, a suggested object of the invention is to validate internal circumferential minimal dimensions and/or coaxial alignment of a combustion turbine combustor igniter port, so that an igniter is insertable into the igniter port during subsequent engine assembly and to mitigate mechanical binding issues that could develop from exposure to thermal cycles.

Another suggested object of the invention is to validate internal circumferential minimal dimensions and/or coaxial alignment of a combustion turbine combustor igniter port prior to installation of the combustor into an engine, so that any structural deviations from dimensional or alignment standards are remediated before combustor installation.

An additional suggested object of the invention is to validate port angle alignment of a combustion turbine combustor igniter port prior to installation of the combustor into an engine, so that any structural deviations from dimensional or alignment standards are remediated before combustor installation.

These and other objects are achieved in one or more exemplary embodiments of the invention by a combustion turbine engine combustor igniter port alignment and dimensional verification tool that is insertable in guide tube and igniter boss portions of the igniter port. The tool has concentrically nested outer and inner sleeves, having respective circumferential profiles that are separately slidably insertable within corresponding igniter port guide tube and igniter boss portions that have inner circumferential profiles in conformance with minimal dimension specifications. Concentric alignment of the guide tube and igniter boss is validated by nesting and inserting the outer and inner sleeves into the igniter port. Optionally a protractor is coupled to the tool, in order to measure igniter port orientation angle. The verification tool is capable of validating igniter port alignment and dimensions before the combustor is installed in a combustion turbine engine thus minimizing the occurrence of fit issues.

Exemplary embodiments of the invention feature an igniter alignment verification tool for a combustion turbine combustor basket of the type having outer and inner combustor shrouds nested along a combustor centerline axis and an igniter port coupled to the inner and outer combustor shrouds at a port angle defined by an igniter port centerline axis and the combustor centerline axis. The igniter port includes a tubular guide tube and a tubular igniter boss that are concentrically aligned along the igniter port centerline axis. The guide tube has a proximal guide tube axial end that is coupled to and outwardly projects from the outer shroud and a guide tube inner circumferential profile having a first minimum dimension specification. The igniter boss has a proximal boss axial end that is coupled to and projects outwardly from the inner shroud, a distal boss axial end proximal the guide tube proximal end and an igniter boss inner circumferential profile having a second minimum dimension specification. The igniter alignment tool features an outer sleeve, having a first distal end defining a first outer circumferential profile that is adapted for slidable insertion into a first minimum dimension guide tube inner circumferential profile. The tool also features an inner sleeve, having a second distal end defining a second outer circumferential profile that is adapted for slidable insertion into a second minimum dimension igniter boss inner circumferential profile. The inner sleeve is slidably retained in nested concentric alignment within the outer sleeve. The combined nested sleeves are slidably insertable within concentrically aligned guide tube and igniter boss respective first and second inner circumferential profiles.

Other exemplary embodiments of the invention feature a method for validating igniter port alignment and/or inner circumferential profile minimal dimension specification conformity for a combustion turbine combustor basket of the type having outer and inner combustor shrouds nested along a combustor centerline axis, with the igniter port coupled to the inner and outer combustor shrouds at a port angle defined by an igniter port centerline axis and the combustor centerline axis. The igniter port includes a tubular guide tube and a tubular igniter boss that are concentrically aligned along the igniter port centerline axis. A guide tube having a proximal guide tube axial end is coupled to and outwardly projects from the outer shroud. The guide tube has an inner circumferential profile having a first minimum dimension specification. The igniter boss has a proximal boss axial end that is coupled to and projects outwardly from the inner shroud, a distal boss axial end proximal the guide tube proximal end and an igniter boss inner circumferential profile having a second minimum dimension specification. The exemplary method comprises providing an alignment tool including an outer sleeve, having a first distal end defining a first outer circumferential profile that is adapted for slidable insertion into a first minimum dimension guide tube inner circumferential profile. The exemplary method also has and an inner sleeve, having a second distal end defining a second outer circumferential profile that is adapted for slidable insertion into a second minimum dimension igniter boss inner circumferential profile. The inner sleeve is slidably retained in nested concentric alignment within the outer sleeve. The outer sleeve first distal end is inserted into the guide tube, validating guide tube conformity with the first minimum dimension specification if said first distal end passes through said guide tube. In addition or in the alternative, when practicing this exemplary method, the inner sleeve second distal end is inserted into the igniter boss, validating igniter boss conformity with the second minimum dimension specification if the second distal end passes through said igniter boss. In addition or in the alternative, when practicing this exemplary method, the combined nested sleeves are inserted into the igniter port, validating concentricity of the guide tube and igniter boss if the respective inner and outer sleeves are received in their corresponding respective guide tube and igniter boss. The progressive checks of igniter boss and guide tube minimum dimensions, igniter boss and guide tube concentricity and igniter angle of alignment allows for detailed troubleshooting of nonconforming parts.

Additional exemplary embodiments of the invention feature a method for fabricating an igniter alignment verification tool for a combustion turbine combustor basket of the type having outer and inner combustor shrouds nested along a combustor centerline axis and an igniter port coupled to the inner and outer combustor shrouds at a port angle defined by an igniter port centerline axis and the combustor centerline axis. The igniter port includes a tubular guide tube and a tubular igniter boss that are concentrically aligned along the igniter port centerline axis. More particularly, the guide tube has a proximal guide tube axial end that is coupled to and outwardly projects from the outer shroud and a guide tube inner circumferential profile having a first minimum dimension specification. The igniter boss has a proximal boss axial end that is coupled to and projecting outwardly from the inner shroud, a distal boss axial end proximal the guide tube proximal end and an igniter boss inner circumferential profile having a second minimum dimension specification. The method comprises modeling in a computer aided design system a first model of the nested combustor basket outer and inner combustor shroud as well as the igniter port, including its guide tube and igniter boss inner circumferential and axial alignment minimum dimensions. Then a second model is created by modeling of an igniter alignment validation tool in a computer aided design system, using the first model to determine alignment tool outer circumferential and axial dimensions that enable the modeled validation tool to be slidably inserted into the first modeled igniter port, including its guide tube and igniter boss. Next the ability of the modeled validation tool to be slidably inserted within the first model igniter port is confirmed in a computer design system. Dimensional specifications of the computer aided design system second model are utilized by an automated manufacturing center to construct a physical specimen of an igniter alignment tool that conforms with dimensions of the second model.

The respective objects and features of embodiments of the invention may be applied jointly or severally in any combination or sub-combination by those skilled in the art.

BRIEF DESCRIPTION OF THE DRAWINGS

The teachings of the embodiments of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be utilized in a combustion turbine engine combustor igniter port alignment and dimensional verification tool that is insertable in guide tube and igniter boss portions of the igniter port. The tool has concentrically nested outer and inner sleeves, having respective circumferential profiles that are separately slidably insertable within corresponding igniter port guide tube and igniter boss portions that have inner circumferential profiles in conformance with minimal dimension specifications. Concentric alignment of the guide tube and igniter boss is validated by nesting and inserting the outer and inner sleeves into the igniter port. Optionally a protractor is coupled to the tool, in order to measure igniter port orientation angle. The verification tool is capable of validating igniter port alignment and dimensions before the combustor is installed in a combustion turbine engine.

Figure 1:
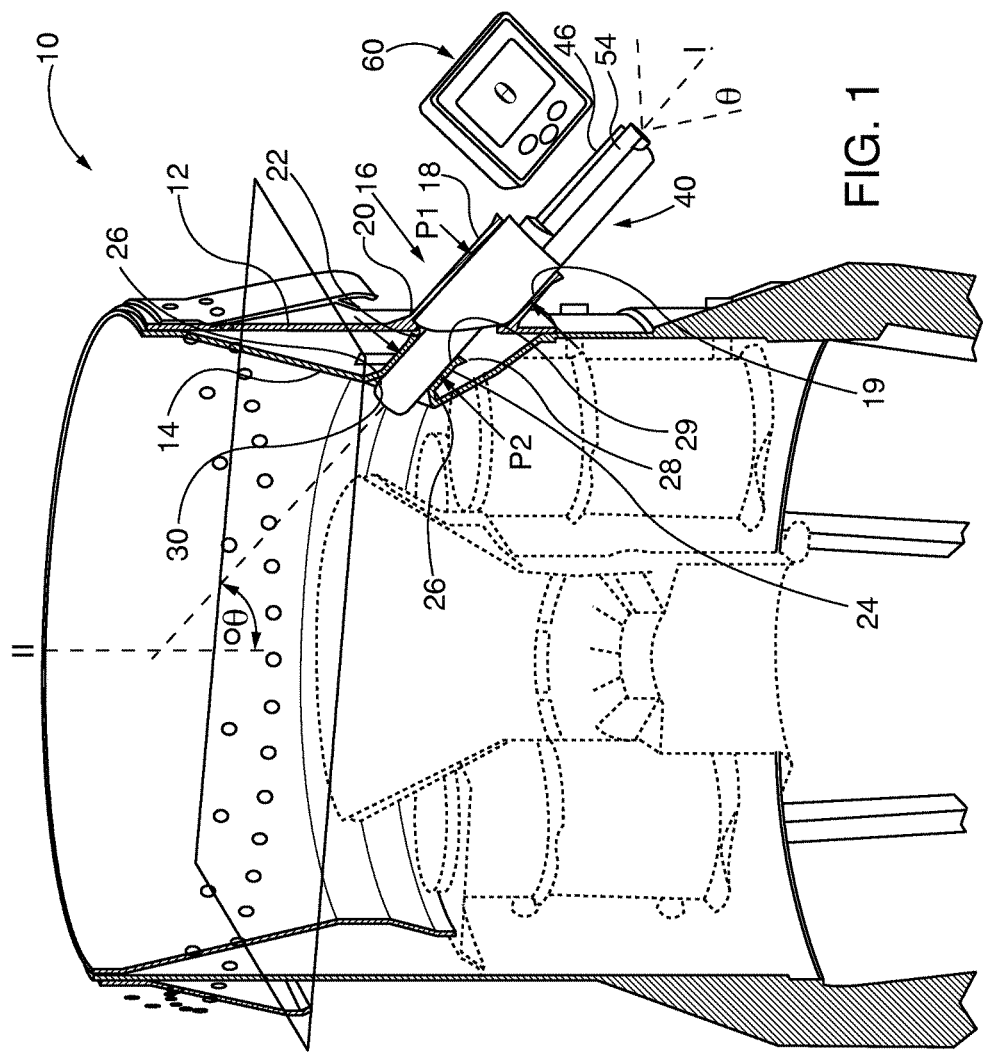
FIG. 1 is a cross sectional elevational view of a combustor basket with its igniter port being validated with an igniter alignment verification tool constructed in accordance with an exemplary embodiment of the invention.

FIG. 1 shows combustion turbine combustor basket 10 of the type having an outer combustor shroud 12 and an inner combustor shroud 14 that are nested along a combustor centerline axis. An igniter port 16 is coupled to the inner and outer combustor shrouds at a port angle θ, which is defined by an igniter port centerline axis I and the combustor centerline axis II. The igniter port 16 defines a generally tube-like passage traversing from outside the outer combustor shroud 12 into the inner combustor shroud 14 interior that is adapted for receipt of a known combustor igniter (not shown). The igniter port 16 includes a tubular guide tube 18 and a tubular igniter boss 24 that are concentrically aligned along the igniter port centerline axis I.

The guide tube 18 has a proximal guide tube axial end 20 that is coupled to and outwardly projects from the outer shroud 12. The guide tube 18 has a guide tube inner circumferential profile 19 that is in communication with the combustor interior by way of a first igniter port hole 22 that is formed within the outer shroud 12. The guide tube inner circumferential profile 19 has a first minimum dimension specification P1 for receipt of an igniter. While the exemplary guide tube 18 inner circumferential profile 19 is shown as a cylindrical profile, other profiles may be utilized.

The igniter boss 24 has a proximal boss axial end 26 that is coupled to and projects outwardly from the inner shroud 14 and a distal boss axial end 28 that is oriented in concentric alignment with and proximal to the guide tube 19 proximal end 20 and the igniter port hole 22. The igniter boss 24 has an igniter boss inner circumferential profile 29 that is in communication with the combustor interior by way of a second igniter port hole 30 that is formed within the inner shroud 14. The igniter boss inner circumferential profile 29 has a second minimum dimension specification P2 for receipt of an igniter. While the exemplary igniter boss 24 inner circumferential profile 29 is shown as a cylindrical profile, other profiles may be utilized.

Figure 2:
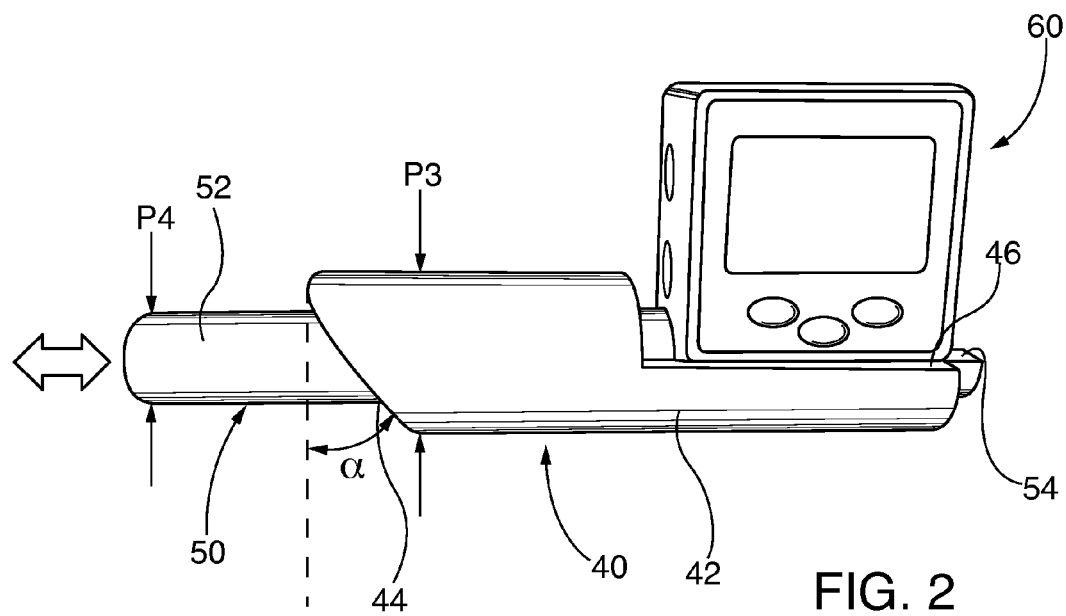
FIG. 2 is a side elevational view of the tool of FIG. 1 along with an electronic protractor coupled to the tool, in accordance with an exemplary embodiment of the invention.

FIGS. 1 and 2 show an exemplary embodiment of an igniter port alignment and dimensional verification tool 40 of the invention. The tool 40 has an outer sleeve 42, having a first distal end 44, which defines a first outer circumferential profile P3 that is adapted for slidable insertion into a first minimum dimension P1 guide tube inner circumferential profile 19. The outer sleeve 42 first distal end 44 is preferably angled at angle $\alpha$ for generally full circumferential abutment proximal a corresponding distal boss axial end 28 of an igniter boss 24 when the outer sleeve is inserted into a guide tube 18. The tool 40 also has an inner sleeve 50, having a second distal end 52, which defines a second outer circumferential profile P4 that is adapted for slidable insertion into a second minimum dimension P1 igniter boss inner circumferential profile 29. Either sleeve 50, 42 are individually insertable in its corresponding guide tube 18 or igniter boss 24.

The outer sleeve 42 and inner sleeve 50 respective outer circumferential profiles P3 and P4 are preferably continuous at least along portions of their axial lengths that are inserted in and corresponding to axial lengths of the guide tube 18 and igniter boss 24. In this way any axial bends in either the guide tube 18 or the igniter boss 24 that compromise concentricity of their respective tubular inner profiles 19 or 29 prevent full insertion of the corresponding outer or inner sleeve 42, 50.

The inner sleeve 50 is slidably retained in nested concentric alignment within the outer sleeve 42, with the combined nested sleeves slidably insertable within concentrically aligned guide tube 18 and igniter boss 24 respective first 19 and second 29 inner circumferential profiles. Similarly, by nesting and simultaneously inserting the combined the sleeves 42, 50 into the igniter port 16, non-concentric misalignment of the guide tube 18 and igniter boss 24 are detected when the sleeves are not insertable into the igniter port.

Igniter port angle $\theta$ is measurable by coupling a protractor, such as an electronic protractor 60 with digital readout, in contact with the inner sleeve 50 or the outer sleeve 42 or both. As shown in FIG. 2, the tool 40 includes a flat surface 46 on the outer sleeve 42 and a flat surface 54 on the inner sleeve 50, which functions as a flat reference contact surface for the protractor 60.

Advantageously prior to installation of a combustor 10 into a combustion turbine combustion section, the tool 40 is utilized to validate any one or more of the following igniter port 16 specifications in any combination and to identify any non-conformities that need to be remediated before the installation:

internal circumferential minimal dimensions of the guide tube 18 or the igniter boss 24 and/or their respective internal concentricity;

concentric axial alignment of the guide tube 18 and igniter boss 24 along the length of the igniter port 16; and port angle $\theta$.

Figure 3:
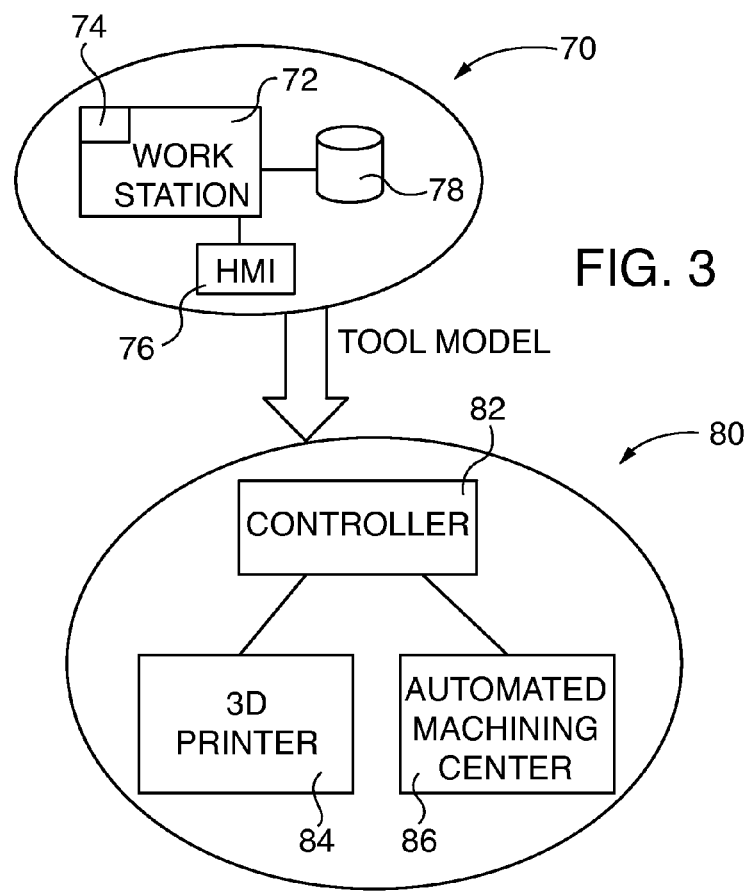
FIG. 3 is a block diagram of an exemplary apparatus and method for virtual modeling of the alignment tool and physical construction of the modeled tool, in accordance with an exemplary embodiment of the invention.
Figure 4:
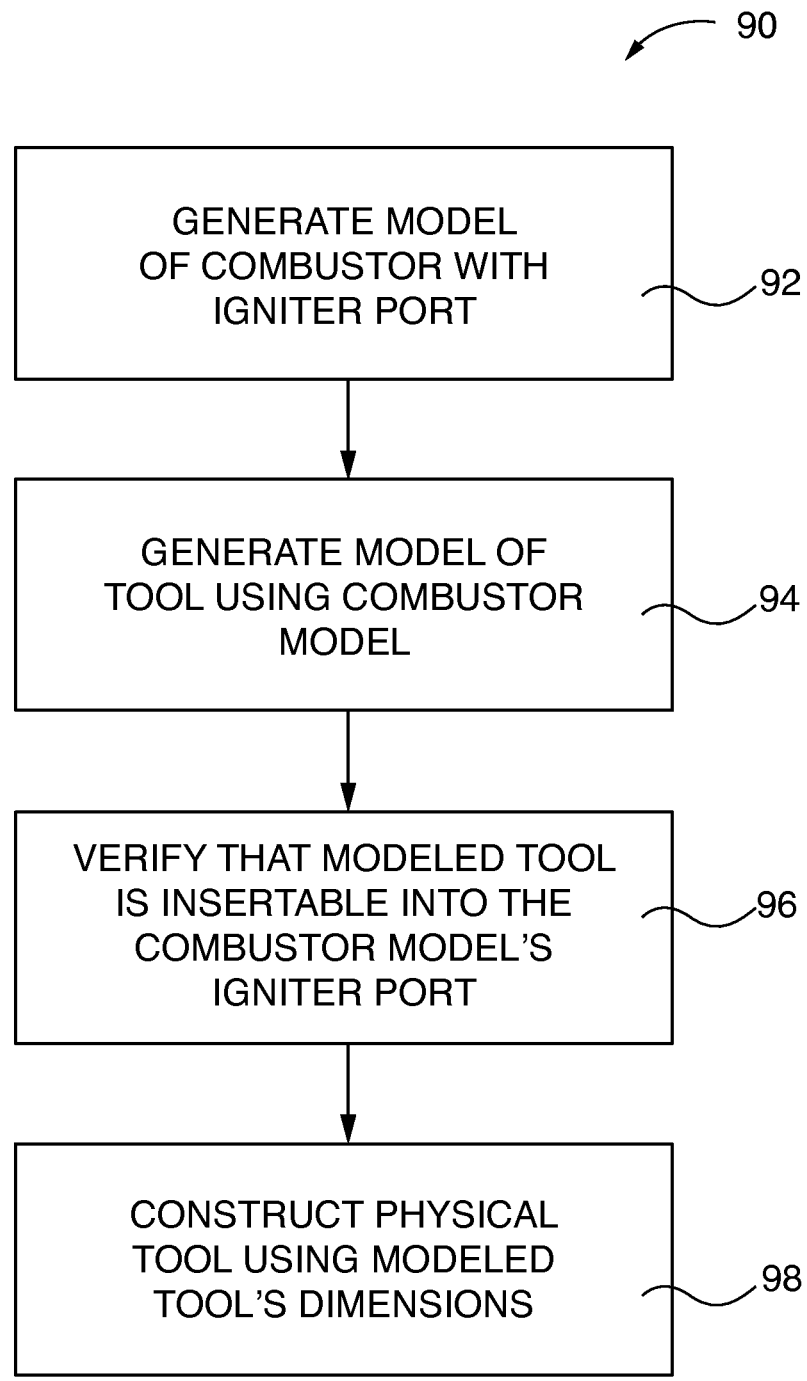
FIG. 4 is a flowchart showing an exemplary method for virtual modeling of the alignment tool and physical construction of the modeled tool.

Referring to FIGS. 3 and 4, the igniter port alignment verification tool 40 is advantageously designed virtually in a design facility 70 on a work station 72 that is configured to operate and execute a known computer aided design (CAD) program 74 that is stored in the workstation. A designer utilizes the CAD program via a human machine interface (HMI) 76, accessing design information about the turbine engine combustor 10 that is stored in a known work station data storage device 78, such as a computer hard drive.

As shown in the tool design and fabrication flow chart 90 of FIG. 4, in step 92 a virtual model of the combustor 10, including its igniter port 16, is created in the workstation 72 using the CAD software program. The combustor virtual model created in the CAD program includes, among other things, minimal dimensional specifications P1 and P2 for the respective guide tube and igniter boss internal circumferential profiles, and the port angle $\theta$.

In step 94 a virtual model of the tool 40 is generated with a CAD program, using the virtual combustor model dimensions created in step 92, in order to design tool dimensions, including the respective outer circumferential profile dimensions P3 and P3 of the inner and outer sleeve 42, 50 that will allow the tool to be inserted into a minimally dimensioned internal circumferential profiles P1, P2 of the guide tube and igniter boss. Once tool virtual model dimensions are determined with the CAD program, in step 96 the virtual tool is tested virtually in the same or another CAD program in a workstation by slidably inserting the virtual tool model into the previously created virtual combustor igniter port model.

Once virtual tool dimensions are established that allow it to be slidably inserted into the virtual igniter port those modeled tool dimensions are utilized in step 98 to construct a physical tool. The tool model's dimensions are communicated to a manufacturing center 80, such as a prototype manufacturing center. A known industrial controller 82 utilizes the modeled tool dimensions to create a set of program commands that will cause a 3D printer 84 or an automated machining center 86 to fabricate a physical tool 40 that conforms to the modeled tool's dimensions. The physical tool 40 is then available to inspect and validate igniter ports 16 of real physical combustors 10, as previously described, preferably before the combustors are installed in a combustion turbine.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. An igniter port alignment verification tool for a combustion turbine combustor basket of the type having:
   outer and inner combustor shrouds nested along a combustor centerline axis;
   an igniter port coupled to the inner and outer combustor shrouds at a port angle defined by an igniter port centerline axis and the combustor centerline axis, the igniter port including a tubular guide tube and a tubular igniter boss that are concentrically aligned along the igniter port centerline axis;
   the guide tube having a proximal guide tube axial end that is coupled to and outwardly projects from the outer shroud, a guide tube axial length, and a guide tube inner circumferential profile having a first minimum dimension specification;
   the igniter boss having a proximal boss axial end that is coupled to and projecting outwardly from the inner shroud, a distal boss axial end proximal the guide tube proximal end, an igniter boss axial length, and an igniter boss inner circumferential profile having a second minimum dimension specification;
   said igniter alignment tool comprising:
      an outer sleeve, having a first distal end defining a first outer circumferential profile that is adapted for slidable insertion into a first minimum dimension guide tube inner circumferential profile, the outer sleeve first circumferential profile continuous at least along its axial length that corresponds to the axial length of the guide tube; and
      an inner sleeve, having a second distal end defining a second outer circumferential profile that is adapted for slidable insertion into a second minimum dimension igniter boss inner circumferential profile;
   the inner sleeve slidably retained in nested concentric alignment within the outer sleeve, with the combined nested sleeves slidably insertable within concentrically aligned guide tube and igniter boss respective first and second inner circumferential profiles.

2. The tool of claim 1, the outer sleeve first distal end angled for circumferential abutment proximal a corresponding distal boss axial end of an igniter boss when said outer sleeve is inserted into a guide tube having an inner circumferential profile meeting the first minimum dimension specification.

3. The tool of claim 1, the outer sleeve first distal end angled for circumferential abutment proximal a corresponding distal boss axial end of an igniter boss when said outer sleeve is inserted into a guide tube having an inner circumferential profile meeting the first minimum dimension specification.

4. The tool of claim 1, further comprising a protractor contacting the inner and/or outer sleeve, for measuring the port angle.

5. The tool of claim 4, the inner and/or outer sleeve having a flat surface for contacting the protractor.

6. The tool of claim 5, the protractor comprising an electronic protractor.

7. An igniter port alignment verification tool for a combustion turbine combustor basket of the type having:
   outer and inner combustor shrouds nested along a combustor centerline axis;
   an igniter port coupled to the inner and outer combustor shrouds at a port angle defined by an igniter port centerline axis and the combustor centerline axis, the igniter port including a tubular guide tube and a tubular igniter boss that are concentrically aligned along the igniter port centerline axis;
   the guide tube having a proximal guide tube axial end that is coupled to and outwardly projects from the outer shroud, a guide tube axial length, and a guide tube inner circumferential profile having a first minimum dimension specification;
   the igniter boss having a proximal boss axial end that is coupled to and projecting outwardly from the inner shroud, a distal boss axial end proximal the guide tube proximal end, an igniter boss axial length, and an igniter boss inner circumferential profile having a second minimum dimension specification;
   said igniter alignment tool comprising:
      an outer sleeve, having a first distal end defining a first outer circumferential profile that is adapted for slidable insertion into a first minimum dimension guide tube inner circumferential profile; and
      an inner sleeve, having a second distal end defining a second outer circumferential profile that is adapted for slidable insertion into a second minimum dimension igniter boss inner circumferential profile, the inner sleeve second circumferential profile continuous at least along its axial length that corresponds to the axial length of the igniter boss;
   the inner sleeve slidably retained in nested concentric alignment within the outer sleeve, with the combined nested sleeves slidably insertable within concentrically aligned guide tube and igniter boss respective first and second inner circumferential profiles.

8. A method for validating igniter port alignment and/or inner circumferential profile minimal dimension specification conformity for a combustion turbine combustor basket of the type having:
   outer and inner combustor shrouds nested along a combustor centerline axis;
   the igniter port coupled to the inner and outer combustor shrouds at a port angle defined by an igniter port centerline axis and the combustor centerline axis, the igniter port including a tubular guide tube and a tubular igniter boss that are concentrically aligned along the igniter port centerline axis;
   the guide tube having a proximal guide tube axial end that is coupled to and outwardly projects from the outer shroud and a guide tube inner circumferential profile having a first minimum dimension specification;
   the igniter boss having a proximal boss axial end that is coupled to and projecting outwardly from the inner shroud, a distal boss axial end proximal the guide tube proximal end and an igniter boss inner circumferential profile having a second minimum dimension specification;

said method comprising:

providing an alignment tool including an outer sleeve, having a first distal end defining a first outer circumferential profile that is adapted for slidable insertion into a first minimum dimension guide tube inner circumferential profile; and an inner sleeve, having a second distal end defining a second outer circumferential profile that is adapted for slidable insertion into a second minimum dimension igniter boss inner circumferential profile; the inner sleeve slidably retained in nested concentric alignment within the outer sleeve;

inserting the outer sleeve first distal end into the guide tube, validating guide tube conformity with the first minimum dimension specification if said first distal end passes through said guide tube; and/or inserting the inner sleeve second distal end into the igniter boss, validating igniter boss conformity with the second minimum dimension specification if said second distal end passes through said igniter boss; and/or inserting the combined nested sleeves into the igniter port, validating alignment of the guide tube and igniter boss if the respective inner and outer sleeves are received in their corresponding respective guide tube and igniter boss.

9. The method of claim 8, comprising performing all three insertions of the outer and inner sleeve respective distal ends and the nested sleeves into the igniter port.

10. The method of claim 9 performed on a combustor basket prior to its installation within a combustion turbine.

11. The method of claim 10, further comprising conforming either or both of the guide tube inner circumferential profile to the first minimum dimension specification or the igniter boss inner circumferential profile to the second minimum dimension specification.

12. The method of claim 10, further comprising concentrically aligning the igniter port guide tube and igniter boss, if the igniter port alignment was not validated, prior to installation of the combustor basket.

13. The method of claim 8, further comprising validating a port angle of an igniter port prior to installation of the combustor basket into a combustion turbine engine, by contacting the inner and/or outer sleeve with a protractor and measuring the port angle, validating the igniter port angle if it conforms with an igniter port angle specification.

14. The method of claim 13, the protractor comprising an electronic protractor.

15. A method for fabricating an igniter port alignment verification tool for a combustion turbine combustor basket of the type having:

outer and inner combustor shrouds nested along a combustor centerline axis;

an igniter port coupled to the inner and outer combustor shrouds at a port angle defined by an igniter port centerline axis and the combustor centerline axis, the igniter port including a tubular guide tube and a tubular igniter boss that are concentrically aligned along the igniter port centerline axis;

the guide tube having a proximal guide tube axial end that is coupled to and outwardly projects from the outer shroud, a guide tube axial length, and a guide tube inner circumferential profile having a first minimum dimension specification;

the igniter boss having a proximal boss axial end that is coupled to and projecting outwardly from the inner shroud, a distal boss axial end proximal the guide tube proximal end, an igniter boss axial length, and an igniter boss inner circumferential profile having a second minimum dimension specification;

said method comprising:

modeling in a computer aided design system a first model of the nested combustor basket outer and inner combustor shroud as well as the igniter port, including its guide tube and igniter boss inner circumferential and axial alignment minimum dimensions;

modeling a second model of an igniter alignment validation tool in a computer aided design system, using the first model to determine alignment tool outer circumferential and axial dimensions that enable the modeled validation tool to be slidably inserted into the first modeled igniter port, including its guide tube and igniter boss;

said second model of an igniter alignment validation tool including:

an outer sleeve, having a first distal end defining a first outer circumferential profile that is adapted for slidable insertion into the first minimum dimension guide tube inner circumferential profile, the outer sleeve first circumferential profile continuous at least along its axial length that corresponds to the axial length of the guide tube; and an inner sleeve, having a second distal end defining the second outer circumferential profile that is adapted for slidable insertion into a second minimum dimension igniter boss inner circumferential profile, the inner sleeve second circumferential profile continuous at least along its axial length that corresponds to the axial length of the igniter boss;

the inner sleeve of said second model slidably retained in nested concentric alignment within the outer sleeve of said second model, with the combined nested sleeves of said second model slidably insertable within concentrically aligned guide tube and igniter boss respective first and second inner circumferential profiles of said first model;

confirming in a computer design system that the second model igniter alignment validation tool is slidably insertable within the first model igniter port;

using the computer aided design system second model dimensional specifications in an automated manufacturing center to construct a physical specimen of an igniter alignment tool that conforms to the second model dimensional specifications.

16. The method of claim 15 the automated manufacturing center comprising a 3-D printer.

17. The method of claim 16, the automated manufacturing center comprising an automated machining center utilizing mechanical or heat ablation cutting heads.

* * * * *